April 4, 1933.  J. A. BERGER  1,903,355
PUNCTURE SEALING FLUID CONTAINER
Filed Oct. 21, 1929
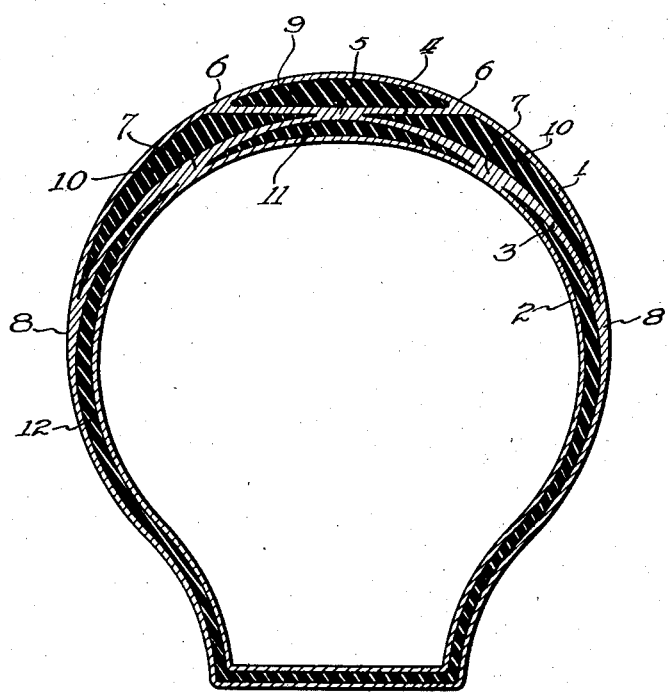
Witness
Arthur M. Franke
Inventor
Joseph A. Berger.
By Rummler & Rummler Attys.

Patented Apr. 4, 1933

1,903,355

UNITED STATES PATENT OFFICE

JOSEPH A. BERGER, OF CHICAGO, ILLINOIS

PUNCTURE SEALING FLUID CONTAINER

Application filed October 21, 1929. Serial No. 401,258.

This invention relates to manufactured rubber goods and the like, such as the inner tubes of pneumatic tires or other fluid containers which are subject to injury by puncture. The invention comes within that particular classification of goods which includes elastic and non-elastic vulcanized rubber walls having spaces between or within the same containing a plastic non-vulcanizable rubber or other plastic composition which serves to seal a puncture through the fluid retaining part of the structure, as for instance a vulcanized rubber wall.

There is no commercially practicable, satisfactory inner tube of this nature for tire casings now available. All appear to lack certain refinements essential to render such tubes suitable for general use with respect to cost and efficiency.

Among the purposes of the present invention is to provide, for example, an inner tube of the class above mentioned with a plurality of spaced walls with intermediate seal container pockets, so that when a nail passes through an inner tube into the air-containing chamber, it will, upon extraction, draw the plastic sealing material through a plurality of walls, and thus provide a multiple seal at the point of injury.

Another object of the invention is to provide a plurality of overlapping sealing material pockets between the inner and outer walls of the tube of the required form, dimensions and capacity to prevent exterior pressure upon an improperly inflated tube from crowding the plastic substance toward the sides of the tube, away from its tread portion and thus render the tube liable to slow leaks when punctured.

The objects of this invention are accomplished by an arrangement such, for example, as the inner tube illustrated in the drawing. This drawing shows a transverse sectional view of the improved product.

Automobiles, particularly the high grade cars, have now been developed to such an extent that with reasonable care such cars can be driven continuously at high speeds over periods which are longer than any one or two drivers would care to operate the car, provided only reasonable care is taken to insure correct lubrication and cooling. The one serious weakness still remaining is the danger of running a nail into the tire. Aside from the loss of time resulting from a puncture, the danger of a nail throwing a car when a puncture occurs in one of the front tires while rotating at high speed is well understood. Much has been done along the lines of the present class of structure to improve the situation. It is further improved by the use of a tube substantially such as shown in the drawing accompanying this specification.

This tube is of such efficiency as to avoid the possibility of a slow leak resulting from a mere nail puncture.

Another phase of the subject is mentioned here because it helps to make clear the utility of this invention, which is that of keeping cars in service, and earning, and operating upon schedule. The correct inflation is maintained indefinitely. The casings containing such tubes remain in service a surprising length of time, because the air pressure within the tube remains constant. The casing is not subject to continuous weakening flexure of its side walls because of low pressure.

Some of the prior structures now available are so poorly arranged, that for instance when the plastic sealing material is arranged on the inner wall within the air chamber the sides of the tubes will stick together when pressed together or folded for shipment. Such a tube is of course a nuisance. Others are single tube tires where the casing and tube are vulcanized as a component or unitary part. The unvulcanized rubber or plastic substance on the outside of the inner tube or between the inner or only tube used, and the fabric casing, inasmuch as the fabric casing is porous, leaks through the casing, and the latter does not perform properly, and as intended.

Another proposal for accomplishing the same general purpose is an arrangement of tubing with a plastic substance on the outside held in place by friction tape, the assumption being that in the case of a puncture the plastic substance will force its way backward into the hole or puncture, regardless of the air pressure against it from within.

Another proposed form of tube is one in which the inside layer at the tread portion is unprotected, unvulcanized rubber. When the tube is deflated, this rubber sticks to the opposite wall, and makes the tube practically useless. It also contains an inner layer of plastic material in one pocket, entirely surrounding the tube. In actual use, it has been shown that a tube of this type, having the plastic substance in only one pocket, this substance being soft, will not stay put, but will work away from the tread portion and mass on the sides, thus defeating the purpose for which it was intended.

Another patented structure is a single tube tire or inner tube with a single pocket or several pockets extending from one side wall across the tread all the way over to the other side wall, with the plastic substance thickest at the tread. This is a mere theoretical form, because in actual use of the tube, the plastic substance therein will not stay where it is wanted, but works away from the tread, where most needed, into masses on the sides, even to the extent of causing the rest of the tube to separate and become useless for puncture sealing. None of the above mentioned prior art, which is substantially all that known to applicant, includes a tube which is properly protected against the results of puncture at any portion thereof.

The desired result is obtained by means of applicant's improved tube, having a series of overlapping pockets, each of moderate capacity, and arranged to retain the plastic material where needed. The improved tube is of multiple wall arrangement, and if the seal at one wall fails, this does not prevent correct closing of the puncture in the remaining walls.

The plastic substance used in the improved tube is not the same as that generally known in this art, as it remains stable at extremely low and high temperatures, the range being beyond that which exists in the normal use of tires, either in a desert or on ice.

In the drawing the multiple walls of the tube are numbered respectively 1, 2, 3, and 4. They are vulcanized together at all meeting points such as indicated in the drawing, as at 5, 6, 7 and 8. The plastic substance within the pockets 9, 10, 11 and 12 formed by the connected walls is not affected by vulcanizing temperatures, but serves efficiently and automatically to heal or seal punctures. Pocket 9 confines the plastic substance locally to the tread. This is a comparatively small, peripheral pocket like the others, but confined exclusively to the tread portion of the tube. The overlapping pockets 10 protect specifically the exposed portions or zones of the side walls parallel with the tread zone 9. The central auxiliary pocket 11 insures a double closure for the tread when punctured and positively assures effective sealing of the wall as a whole when punctured on the tread zone.

The greater part of the tread is protected by four walls and three concentric layers of sealing material. Bordering the tread are zones protected by three walls and two layers of sealing material. The sides and base of the tube or tire are protected by two walls and a single layer of sealing material.

This positive localization of overlapped seal pockets provides for maintaining such distribution of sealing material as will assure against lack of such material at any vulnerable point; and this assures prompt sealing wherever a puncture may occur.

This construction minimizes and substantially eliminates all need for attention to punctures during the life of the tube or tire.

Although but one specific embodiment of this invention is herein shown and described, it is to be understood that some of the details of the construction shown may be altered or omitted without departing from the spirit of the invention as defined by the following claims.

I claim:

1. A pneumatic member for wheels comprising a tubular body having concentric peripheral tread chambers, a pair of lateral chambers partly interposed edgewise between said tread chambers, each of said chambers containing plastic sealing material, said chambers being arranged to provide three concentric layers of sealing material over the greater part of the tread portion of said member, and two concentric layers of sealing material at the portions of said member bordering the tread portion.

2. A flexible tire tube comprising a plurality of chambers each containing sealing fluid, and which tube, in cross section, presents a construction having the outer middle tread chamber deep and full at the middle part and tapered to a thin edge at each side of the tread, side tread chambers each deep and full toward the side parts of the tread and tapered to a thin edge overlapping the thin edges of the tread chamber, and tapered to a thin edge extending along the side of the tube, an inner middle tread chamber deep and full at its middle part and tapered toward a thin edge of one of said side tread chambers, and a side chamber extending along each side of the tube and tapered to a thin edge overlapping the adjoining thin edge of the side tread chamber.

Signed at Chicago this 18th day of October, 1929.

JOSEPH A. BERGER.